(12) United States Patent
Tsuji et al.

(10) Patent No.: US 10,669,852 B2
(45) Date of Patent: Jun. 2, 2020

(54) GAS TURBINE

(71) Applicant: MITSUBISHI HITACHI POWER SYSTEMS, LTD., Kanagawa (JP)

(72) Inventors: Yoshifumi Tsuji, Kanagawa (JP); Shinya Hashimoto, Kanagawa (JP); Yasunori Nishioka, Kanagawa (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 618 days.

(21) Appl. No.: 15/304,659

(22) PCT Filed: May 20, 2015

(86) PCT No.: PCT/JP2015/064484
§ 371 (c)(1),
(2) Date: Oct. 17, 2016

(87) PCT Pub. No.: WO2015/186523
PCT Pub. Date: Dec. 10, 2015

(65) Prior Publication Data
US 2017/0037730 A1 Feb. 9, 2017

(30) Foreign Application Priority Data
Jun. 4, 2014 (JP) .................................. 2014-116167

(51) Int. Cl.
*F01D 5/08* (2006.01)
*F01D 25/12* (2006.01)
(Continued)

(52) U.S. Cl.
CPC ............. *F01D 5/081* (2013.01); *F01D 5/082* (2013.01); *F01D 9/041* (2013.01); *F01D 11/001* (2013.01);
(Continued)

(58) Field of Classification Search
CPC ........ F02C 7/18; F02C 7/141; F05D 2260/14; F05D 2260/2212; F05D 2240/126;
(Continued)

(56) References Cited

U.S. PATENT DOCUMENTS 4,217,755 A   8/1980  Williams
4,462,204 A   7/1984  Hull
(Continued)

FOREIGN PATENT DOCUMENTS

JP   4-241744       8/1992
JP   2003-500585    1/2003
(Continued)

OTHER PUBLICATIONS

International Search Report dated Aug. 25, 2015 in International (PCT) Application No. PCT/JP2015/064484.
(Continued)

*Primary Examiner* — Kenneth J Hansen
*Assistant Examiner* — Justin A Pruitt
(74) *Attorney, Agent, or Firm* — Wenderoth, Lind & Ponack, L.L.P.

(57) ABSTRACT

A gas turbine includes: a first cavity inside a stationary body and supplied with cooling air; a second cavity between the stationary body and a rotating body; a first cooling passage between the first and second cavities and having a swirl flow guide nozzle therein by which the cooling air of the first cavity is supplied to the second cavity while being swirled along a rotation direction of the rotating body; a second cooling passage in the rotating body, in communication with the second cavity, and supplied with the cooling air of the second cavity; and a flow regulating passage, different from the first cooling passage, between the first cavity and the second cavity and through which the cooling air is supplied from the first cavity to the second cavity, wherein the flow
(Continued)

regulating passage has a flow regulator for regulating a flow rate of the cooling air.

16 Claims, 7 Drawing Sheets

(51) Int. Cl.
  *F01D 11/00* (2006.01)
  *F01D 9/04* (2006.01)
  *F01D 11/06* (2006.01)
(52) U.S. Cl.
  CPC ............ *F01D 11/003* (2013.01); *F01D 11/06* (2013.01); *F01D 25/12* (2013.01); *F05D 2220/32* (2013.01); *F05D 2240/126* (2013.01); *F05D 2240/129* (2013.01); *F05D 2260/14* (2013.01); *F05D 2260/2212* (2013.01)
(58) Field of Classification Search
  CPC ........... F05D 2240/129; F05D 2220/32; F01D 9/065; F01D 25/08; F01D 25/12; F01D 11/001; F01D 11/003; F01D 11/06; F01D 9/041; F01D 5/08; F01D 5/081; F01D 5/082
  USPC .......................................................... 415/115
  See application file for complete search history.

(56) References Cited

U.S. PATENT DOCUMENTS

| | | | | |
|---|---|---|---|---|
| 5,197,863 | A * | 3/1993 | Dardis | ................. F04C 19/002 |
| | | | | 415/128 |
| 6,183,193 | B1 | 2/2001 | Glasspoole et al. | |
| 6,468,032 | B2 | 10/2002 | Patel | |
| 2001/0048878 | A1 * | 12/2001 | Willett | .................... F01D 5/182 |
| | | | | 416/97 R |
| 2004/0247429 | A1 * | 12/2004 | Arilla | ..................... F01D 5/081 |
| | | | | 415/116 |
| 2009/0053050 | A1 * | 2/2009 | Bruce | .................... F01D 25/04 |
| | | | | 415/200 |
| 2011/0247345 | A1 | 10/2011 | Laurello et al. | |
| 2011/0250057 | A1 * | 10/2011 | Laurello | ................ F01D 5/081 |
| | | | | 415/180 |

FOREIGN PATENT DOCUMENTS

| | | |
|---|---|---|
| JP | 2010-196501 | 9/2010 |
| JP | 2011-137389 | 7/2011 |
| JP | 2013-185453 | 9/2013 |

OTHER PUBLICATIONS

English translation of Written Opinion of the Searching Authority dated Aug. 25, 2015 in corresponding International (PCT) Application No. PCT/JP2015/064484.

* cited by examiner

GAS TURBINE

TECHNICAL FIELD

The present invention relates to a gas turbine through the inside of which cooling air flows.

BACKGROUND ART

A gas turbine is composed of a compressor, a combustor, and a turbine. The compressor compresses air, taken in through an air inlet, into high-temperature, high-pressure compressed air. The combustor produces high-temperature, high-pressure combustion gas by supplying fuel to the compressed air and combusting the mixture. The turbine has pluralities of turbine vanes and turbine blades installed alternately along a passage inside a casing, and a turbine shaft coupled to a generator is driven to rotate as the turbine blades are driven by the combustion gas supplied to the passage. The combustion gas having driven the turbine is released as exhaust gas into the atmosphere.

The gas turbine has a cooling air system (cooling air supply means) in which the compressed air compressed by the compressor is taken out and cooled by a heat exchanger (TCA cooler) etc., and then is supplied to the turbine side, at the interface between parts of a rotating body, including the turbine blades, and fixed parts so as to cool those parts.

Japanese Patent Publication No. 2011-137389 describes a gas turbine cooling flow passage structure having: a plurality of cooling medium flow passages that guide a cooling medium for cooling the rotating body of the gas turbine from a stationary body toward the rotating body and guide the cooling medium in a rotation direction of the rotating body; a cooling medium guide part that serves as a partition between each two of the plurality of cooling medium flow passages and constitutes a wall surface; and a shroud part that is disposed in at least one end part of the cooling medium guide part. The cooling flow passage structure is composed of a plurality of segments each having the cooling medium guide part and the shroud part, with the shape of one cooling medium guide part in at least one segment being different from the shape of the other cooling medium guide parts in the other segments, and the flow passage sectional area of the cooling medium flow passage adjacent to that one cooling medium guide part being different from the flow passage sectional area of the cooling medium flow passages defined between the other cooling medium guide parts.

Technical Problem

As in the cooling flow passage structure shown in Japanese Patent Publication No. 2011-137389, it is possible to regulate the amount of cooling air supplied by adjusting the flow passage sectional area. However, the structure described in Japanese Patent Publication No. 2011-137389 makes the work of regulating the amount of cooling air supplied complicated as well as difficult.

SUMMARY OF INVENTION

An object of the present invention that solves the above problem is to provide a gas turbine in which the amount of cooling air supplied can be regulated efficiently and easily.

Solution to Problem

To achieve the above object, the present invention provides a gas turbine in which a stationary body and a rotating body are provided and the rotating body is supplied with cooling air, the gas turbine including: a first cavity formed inside the stationary body and supplied with cooling air; a second cavity formed between the stationary body and the rotating body; a first cooling passage formed between the first cavity and the second cavity and having a swirl flow guide nozzle disposed therein by which the cooling air of the first cavity is supplied to the second cavity while being swirled along a rotation direction of the rotating body; a second cooling passage formed in the rotating body, communicating with the second cavity, and supplied with the cooling air of the second cavity; and a flow regulating passage which is a cooling air flow passage, different from the first cooling passage, formed between the first cavity and the second cavity and through which the cooling air is supplied from the first cavity to the second cavity, wherein the flow regulating passage has flow regulating means for regulating the flow rate of the cooling air.

It is preferable that a plurality of the swirl flow guide nozzles are disposed around an axis of the rotating body, and that a plurality of the flow regulating passages are disposed around the axis of the rotating body.

It is preferable that the flow regulating means is a plug that is detachably attached to the flow regulating passage, and that the plug has a guide hole for the cooling air to flow through.

It is preferable that, when seen from the axial direction of the rotating body, the guide hole is inclined relative to a line that passes through the center of the rotating body and extends in the radial direction of the rotating body.

It is preferable that, when seen from the axial direction of the rotating body, the flow regulating passage is inclined relative to a line that passes through the center of the rotating body and extends in the radial direction of the rotating body.

It is preferable that a discharge opening of the flow regulating passage leading to the second cavity is formed in a surface of the stationary body that extends in the radial direction and the circumferential direction of a rotational axis, and that an end part of the flow regulating passage on the discharge opening side extends in a direction parallel to the axial direction of the rotating body, or in a direction inclined toward the rotation direction of the rotating body relative to the axial direction of the rotating body.

It is preferable that a discharge opening of the flow regulating passage leading to the second cavity is formed in a surface of the stationary body that extends in the axial direction and the circumferential direction of a rotational axis, and that an end part of the flow regulating passage on the discharge opening side extends in a direction parallel to the radial direction of the rotating body, or in a direction inclined toward the rotation direction of the rotating body relative to the radial direction of the rotating body.

It is preferable that an opening of the flow regulating passage on the first cavity side is disposed at a position overlapping a leading edge of the swirl flow guide nozzle in the circumferential direction of the rotating body.

It is preferable that the gas turbine further includes a rim seal space formed between the stationary body and a surface of the rotating body that extends in the radial direction and the circumferential direction, and a rim seal air flow regulating passage that is a cooling air flow passage, different from the first cooling passage and the flow regulating passage, formed between the first cavity and the rim seal space; and that the rim seal air flow regulating passage has rim seal air flow regulating means for regulating the flow rate of the cooling air supplied from the first cavity to the rim seal space.

It is preferable that the rim seal air flow regulating means is a plug that is detachably attached to the rim seal air flow regulating passage, and that the plug has a guide hole for the cooling air to flow through.

It is preferable that an opening of the rim seal air flow regulating passage on the first cavity side is disposed at a position overlapping a leading edge of the swirl flow guide nozzle in the circumferential direction of the rotating body.

It is preferable that the rim seal air flow regulating passage is formed at a position overlapping the flow regulating passage in the circumferential direction of the rotating body, and that the stationary body has a maintenance opening formed at a position located further on the radially outer side of the rotating body than the rim seal air flow regulating passage and facing a discharge opening of the rim seal air flow regulating passage leading to the rim seal space.

Advantageous Effects of Invention

According to the present invention, it is possible to efficiently and easily regulate the amount of cooling air supplied by providing the flow regulating passage, which is separate from the flow passage where the swirl flow guide nozzles are disposed, and regulating the flow rate by the flow regulating means.

DESCRIPTION OF EMBODIMENTS

In the following, a preferred embodiment of the present invention will be described in detail with reference to the accompanying drawings. However, the present invention is not limited by this embodiment, and if there are a plurality of embodiments, the present invention also includes combinations of such embodiments.

Figure 1:
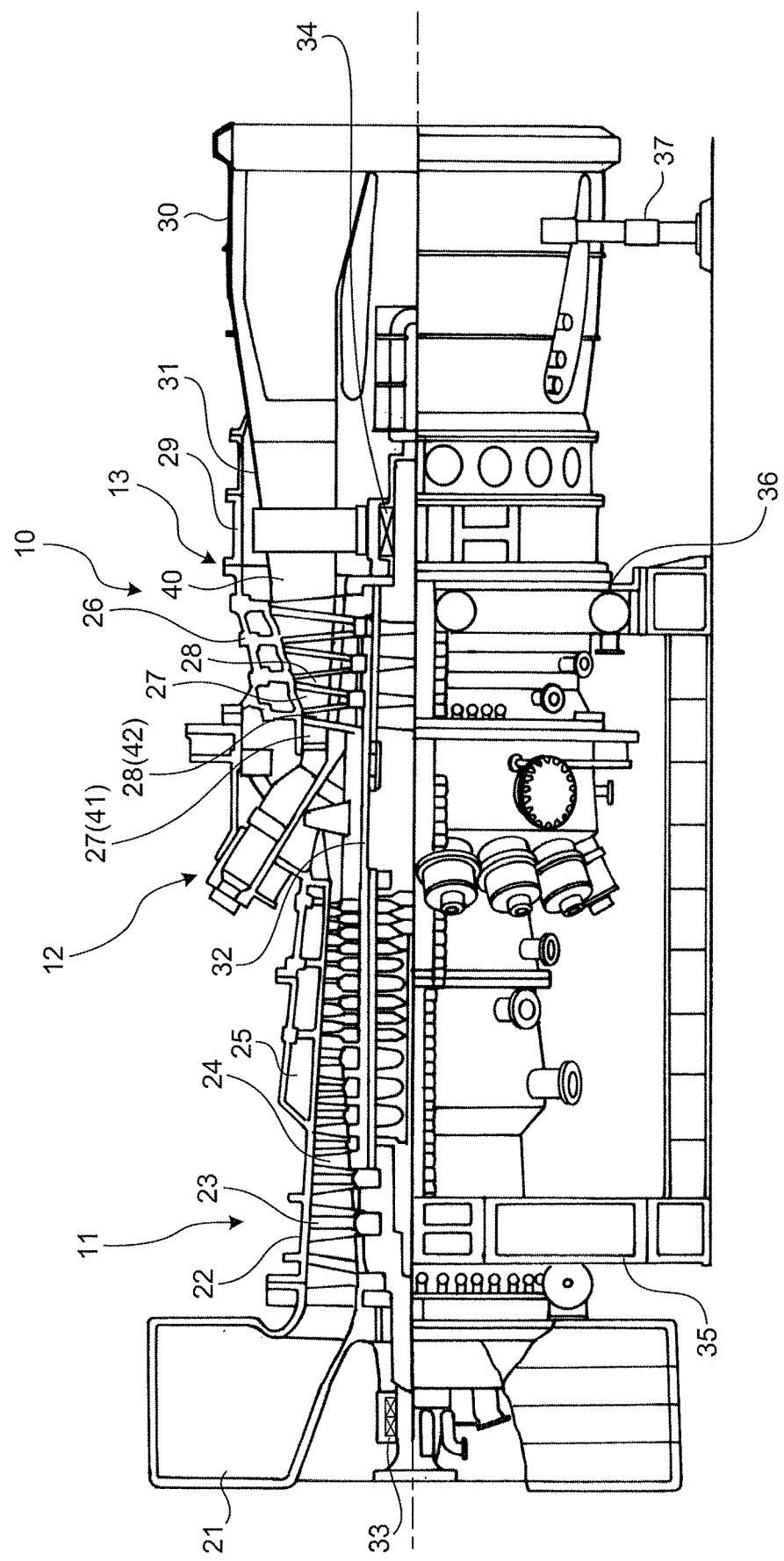
FIG. 1 is a schematic view representing a gas turbine according to an embodiment.

FIG. 1 is a schematic view representing a gas turbine according to this embodiment. As shown in FIG. 1, a gas turbine 10 is composed of a compressor 11, a combustor 12, and a turbine 13. The gas turbine 10 can generate electrical power with a generator coupled thereto.

The compressor 11 has an air inlet 21 through which air is taken in, and pluralities of vanes 23 and blades 24 installed alternately in a front-rear direction (an axial direction of a rotor 32 to be described later) inside a compressor casing 22, with a bleed air chamber 25 provided on the outer side of the compressor casing 22. The combustor 12 supplies fuel to the compressed air compressed in the compressor 11 and ignites the fuel to combust the mixture. The turbine 13 has pluralities of vanes 27 and blades 28 installed alternately in the front-rear direction (the axial direction of the rotor 32 to be described later) inside a turbine casing 26. On the downstream side from the turbine casing 26, an exhaust chamber 30 is installed through an exhaust casing 29, and the exhaust chamber 30 has an exhaust diffuser 31 that continues to the turbine 13.

The rotor (turbine shaft) 32 is disposed so as to penetrate center parts of the compressor 11, the combustor 12, the turbine 13, and the exhaust chamber 30. The rotor 32 has one end on the side of the compressor 11 rotatably supported by a bearing 33 and the other end on the side of the exhaust chamber 30 rotatably supported by a bearing 34. A stack of a plurality of discs with the blades 24 mounted thereon is fixed to the rotor 32 in the compressor 11, and a stack of a plurality of discs with the blades 28 mounted thereon is fixed to the rotor 32 in the turbine 13, and a driving shaft of the generator is coupled to the end of the rotor 32 on the side of the compressor 11.

Of the gas turbine 10, the compressor casing 22 of the compressor 11, the turbine casing 26 of the turbine 13, and the exhaust chamber 30 are respectively supported by legs 35, 36, 37.

A ring-shaped combustion gas passage 40 is formed on the inner side of the turbine casing 26, and the pluralities of vanes 27 and blades 28 are installed alternately in the combustion gas passage 40 along a combustion gas flow direction. Specifically, the vane 27 of each stage is composed of a plurality of vanes 41 that are disposed at equal intervals in the circumferential direction and fixed to the turbine casing 26. The blade 28 of each stage is composed of a plurality of blades 42 that are disposed at equal intervals in the circumferential direction and fixed to the rotor 32.

Accordingly, air taken in through the air inlet 21 of the compressor 11 is compressed into high-temperature, high-pressure compressed air by passing through the pluralities of vanes 23 and blades 24. In the combustor 12, a predetermined fuel is supplied to the compressed air and the mixture is combusted. Then, the high-temperature, high-pressure combustion gas, which is a working fluid generated in the combustor 12, passes through the pluralities of vanes 27 and blades 28 of the turbine 13, thereby driving the rotor 32 to rotate and driving the generator coupled to the rotor 32. Meanwhile, the energy of the exhaust gas (combustion gas) is released into the atmosphere after being converted into a pressure and decelerated by the exhaust diffuser 31 of the exhaust chamber 30.

Figure 2:
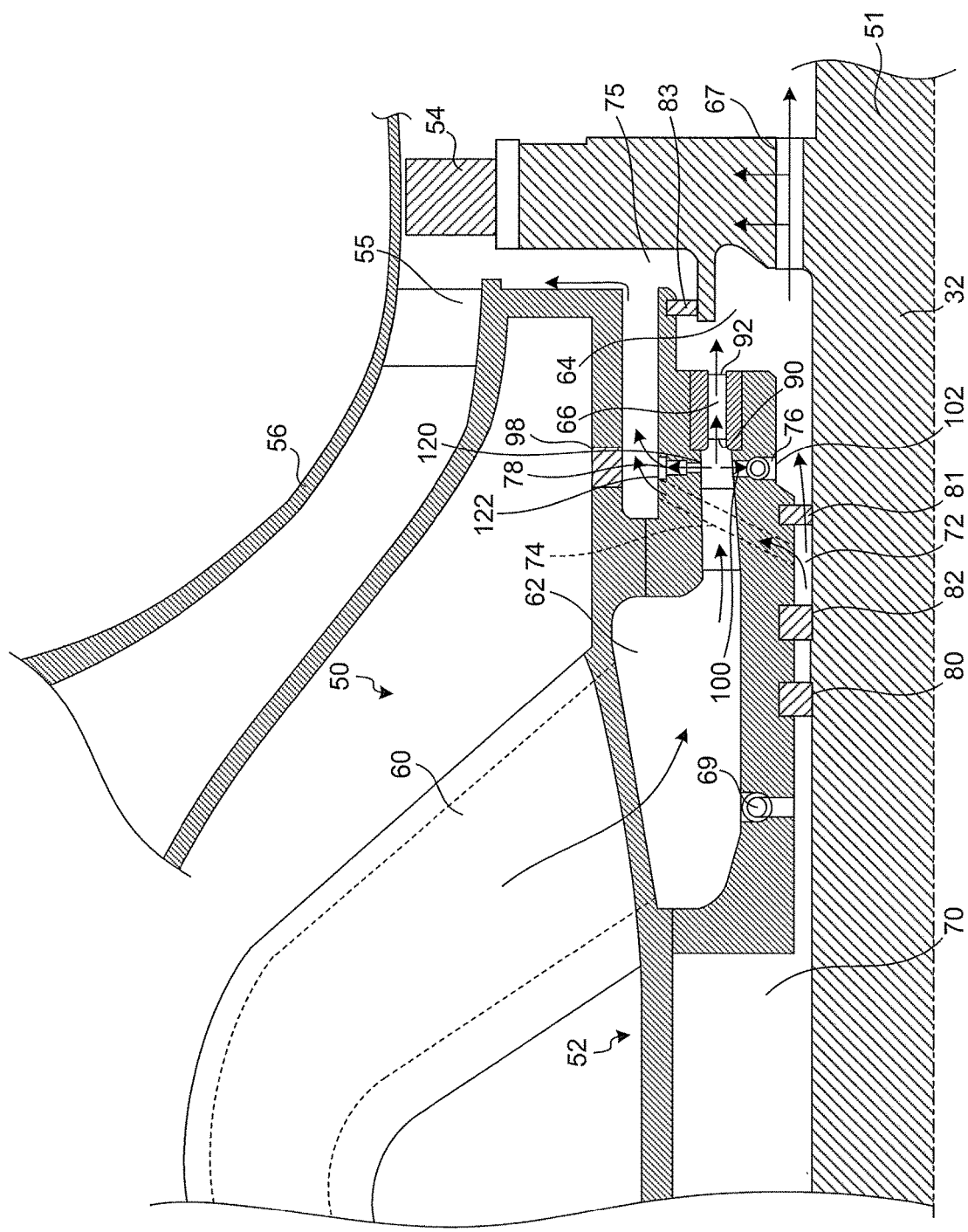
FIG. 2 is a schematic view representing a cooling flow passage structure of the gas turbine.
Figure 3:
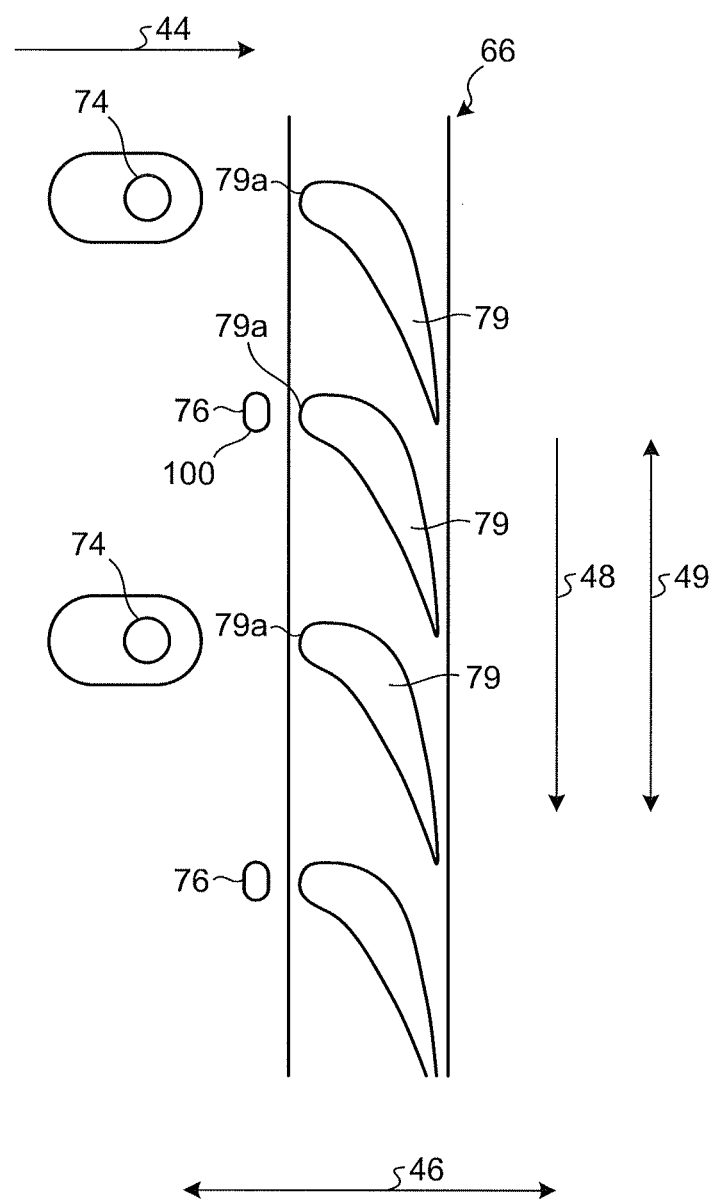
FIG. 3 is a schematic view showing the structure around swirl flow guide nozzles.
Figure 4:
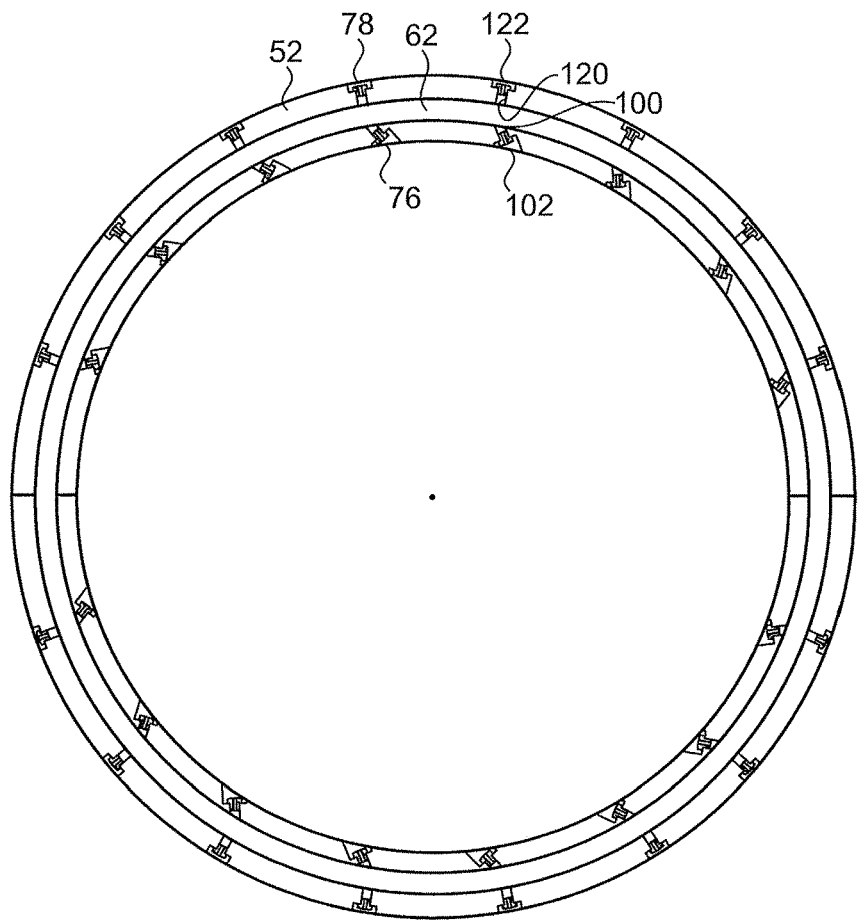
FIG. 4 is a schematic view showing the arrangement of first flow regulating passages and second flow regulating passages.
Figure 5:
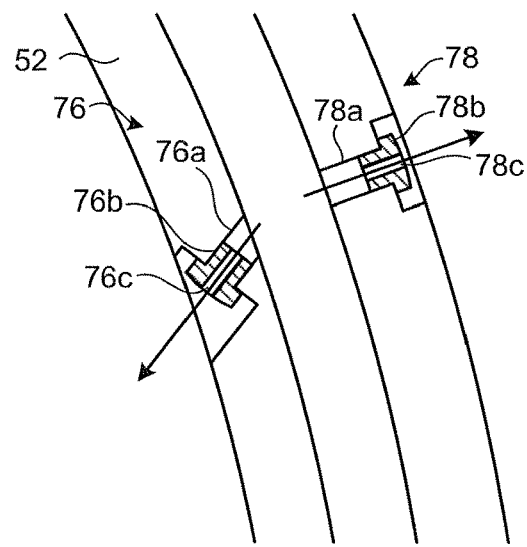
FIG. 5 is an enlarged schematic view showing the first flow regulating passage and the second flow regulating passage.
Figure 6:
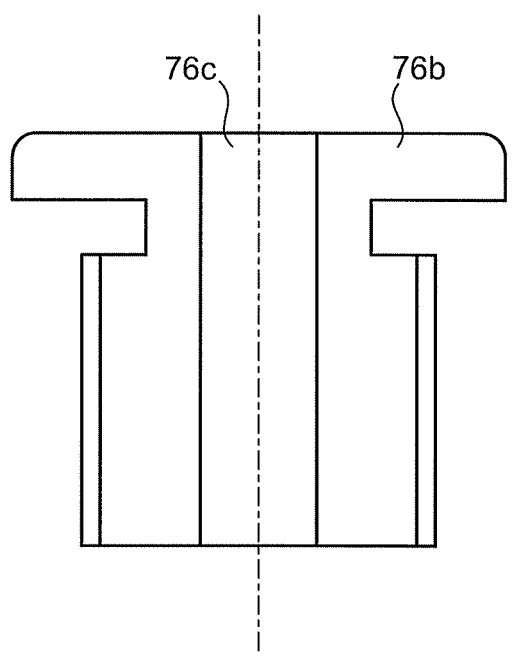
FIG. 6 is an enlarged schematic view showing a plug.

Next, the cooling flow passage structure of the gas turbine will be described using FIG. 2 to FIG. 6. FIG. 2 is a schematic view representing the cooling flow passage structure of the gas turbine. FIG. 3 is a schematic view showing the structure around swirl flow guide nozzles. FIG. 4 is a schematic view showing the arrangement of first flow regulating passages and second flow regulating passages. FIG. 5 is an enlarged schematic view showing the first flow regulating passage and the second flow regulating passage. FIG. 6 is an enlarged schematic view showing a plug.

A cooling flow passage structure 50 is configured such that the compressed air compressed by the compressor 11 of the gas turbine 10 is supplied as cooling air after being cooled by a cooling mechanism, such as a TCA cooler. The cooling flow passage structure 50 allows the cooling air supplied thereto to flow to parts of the gas turbine 10, especially parts in the vicinity of the combustor 12, and cool those parts that are heated by the combustion gas.

The cooling flow passage structure 50 is a flow passage for cooling air to flow through that is formed in each of a rotating body 51 and a stationary body 52 and in a space between the rotating body 51 and the stationary body 52. Here, the rotating body 51 includes the rotor 32, the blades 28, etc. In FIG. 2, the rotor 32 and a first-stage blade 54 of the rotating body 51 are shown. The stationary body 52 includes the vanes 27, the casing supporting the vanes 27, etc. In FIG. 2, among the vanes 27, a first-stage vane 55 on the upstream side in the combustion gas flow direction from the first-stage blade 54 is shown. A transition piece 56 of the combustor 12 is disposed on the upstream side of the combustion gas from the position where the first-stage vane 55 is disposed.

The cooling flow passage structure 50 has a supply passage 60, a first cavity 62, a second cavity 64, a first cooling passage 66, a second cooling passage 67, a third cooling passage 69, a cooling space 70, a bypass space 72, a jumper tube 74, and a rim seal space 75.

The supply passage 60 is a pipe that is connected to the stationary body 52 and supplies cooling air into the stationary body 52. The first cavity 62 is a space connected to the supply passage 60 and formed inside the stationary body 52. The first cavity 62 extends around the entire rotating body 51 in the rotation direction (circumferential direction). The first cavity 62 may be a space divided into a plurality of parts in the rotation direction (circumferential direction), or may be a single space. The second cavity 64 is a space formed between the first cavity 62 and the first-stage blade 54 in the axial direction of the rotating body 51, in a region surrounded by the rotating body 51 and the stationary body 52. The second cavity 64 extends around the entire rotating body 51 in the rotation direction (circumferential direction). The second cavity 64 may be a space divided into a plurality of parts in the rotation direction (circumferential direction), or may be a single space.

The first cooling passage 66 is a passage that connects the first cavity 62 and the second cavity 64 to each other. The first cooling passage 66 is a ring-shaped pipeline formed around the axis of the rotating body 51, with the end on the side of the first cavity 62 being an opening 90 and the end on the side of the second cavity 64 being a discharge opening 92. As shown in FIG. 3, the first cooling passage 66 has swirl flow guide nozzles 79 disposed therein at predetermined intervals in the circumferential direction. The swirl flow guide nozzle 79 is a so-called TOBI nozzle. Here, TOBI is an acronym standing for tangential on-board injection. The swirl flow guide nozzle 79 imparts a component of flow velocity in the rotation direction to cooling air (cooling medium), which flows from the first cavity 62 into the second cavity 64, by accelerating the cooling air in the rotation direction of the rotating body 51 while expanding the cooling air.

As shown in FIG. 3, the swirl flow guide nozzle 79 has a shape that is tapered from an end surface 79a on the upstream side in a cooling air flow direction 44 toward the downstream side, and is disposed at an angle to a rotation direction 48. The cooling air flowing through the first cooling passage 66 flows between the swirl flow guide nozzles 79, and the flow direction 44 is inclined toward the rotation direction 48 while the cooling air is passing between the swirl flow guide nozzles 79. The shape of the swirl flow guide nozzle 79 is not particularly limited as long as the swirl flow guide nozzle 79 can impart a component of flow velocity in the rotation direction and expand air.

The second cooling passage 67 is formed in the rotating body 51 and communicates with the second cavity 64. The second cooling passage 67 supplies the cooling air, having been supplied to the second cavity 64, to parts inside the rotating body 51. Specifically, the second cooling passage 67 is connected to a passage formed inside the first-stage blade 54 and supplies the cooling air into the first-stage blade 54. The second cooling passage 67 also supplies the cooling air to parts of the blades in the second and subsequent stages.

The third cooling passage 69 is formed through the surface on the radially inner side of the first cavity 62 and communicates with the cooling space 70. Swirl flow guide nozzles are provided in the third cooling passage 69 as in the first cooling passage 66. Accordingly, air supplied to the cooling space 70 forms a flow with a component of flow velocity in the rotation direction imparted thereto.

The cooling space 70 is a space formed between the rotating body 51 and the stationary body 52, and is formed further on the side of the supply passage 60 than the second cavity 64 in an axial direction 46. The cooling space 70 is supplied with the cooling air of the first cavity 62 through the third cooling passage 69. The cooling space 70 cools the surrounding rotating body 51 and stationary body 52 by being supplied with the cooling air.

The bypass space 72 is a space formed between the rotating body 51 and the stationary body 52, and is formed between the cooling space 70 and the second cavity 64. In the bypass space 72, sealing mechanisms 80, 81, 82 that seal the gap between the rotating body 51 and the stationary body 52 are disposed. The sealing mechanisms 80, 81, 82 are labyrinth seals. Although the sealing mechanisms 80, 81, 82 are provided in the bypass space 72, a part of air flows from the cooling space 70 toward the second cavity 64 due to a pressure difference.

The jumper tube 74 is formed in the stationary body 52 and connected to the space between the sealing mechanism 82 of the bypass space 72 and the second cavity 64. The jumper tube 74 is a pipeline and communicates with the rim seal space 75.

The rim seal space 75 is a space formed between the stationary body 52 and the surface of the rotating body 51 that extends in the radial direction and the circumferential direction, specifically, the surface of the rotating body 51 on the side of the first cavity 62 that extends in the radial direction in a part where the rotor 32 and the first-stage vane 55 communicate with each other. The rim seal space 75 is formed further on the radially outer side than the second cavity 64. A sealing mechanism 83 is disposed between the rim seal space 75 and the second cavity 64. An opening of the jumper tube 74 is formed in the surface of the stationary body 52 inside the rim seal space 75. That is, the rim seal space 75 communicates with the jumper tube 74. The rim seal space 75 extends around the entire rotating body 51 in the rotation direction 48 (circumferential direction 49). The rim seal space 75 may be a space divided into a plurality of parts in the rotation direction 48 (circumferential direction 49), or may be a single space.

The cooling flow passage structure 50 of this embodiment further has first flow regulating passages 76 and second flow regulating passages (rim seal air flow regulating passages) 78. The first flow regulating passages 76 are cooling air flow passages that are different from the first cooling passage 66 where the swirl flow guide nozzles 79 are disposed. As shown in FIG. 4, the plurality of first flow regulating passages 76 are formed at predetermined intervals in the rotation direction 48 (circumferential direction 49) of the rotating body 51.

The first flow regulating passage 76 is a pipeline formed between the first cavity 62 and the second cavity 64. One end of the first flow regulating passage 76 on the side of the first cavity 62 is an opening 100, and the other end on the side of the second cavity 64 is a discharge opening 102. The first flow regulating passage 76 is inclined toward the rotation direction relative to the radial direction.

The first flow regulating passage 76 has a flow passage main body (plug hole) 76a, and a plug 76b that is detachably provided in the flow passage main body 76a. The flow passage main body 76a is a hole penetrating the stationary body 52, and provides communication between the first cavity 62 and the second cavity 64. The flow passage main body 76a has a structure for supporting the plug 76b, for example, a threaded hole or concave and convex shapes. As shown in FIG. 4 to FIG. 6, the plug 76b is a bolt, pin, or the like that is detachably attached to the flow passage main body 76a. The plug 76b has a guide hole 76c that penetrates the plug 76b in a direction along the flow passage main body 76a.

With the plug 76b inserted into the flow passage main body 76a, the first flow regulating passage 76 allows cooling air to be supplied from the first cavity 62 to the second cavity 64 by passing through the guide hole 76c. By being inclined toward the rotation direction, the first flow regulating passage 76 can impart a component of velocity in the rotation direction to the cooling air supplied to the second cavity 64. It is possible to adjust the flow passage resistance of the first flow regulating passage 76 and the ease with which the cooling air passes therethrough by adjusting the area or the position of the guide hole 76c of the plug 76b inserted into the flow passage main body 76a. The area of the guide hole 76c, which is the opening area of the hole, can be adjusted by changing the diameter or the side length of the opening. The area of the guide hole 76c of the first flow regulating passage 76 can be changed by changing the plug 76b inserted into the flow passage main body 76a. Alternatively, the first flow regulating passage 76 may have a structure in which the opening area of the plug 76b varies according to the position in the direction of insertion into the flow passage main body 76a, and the area of the guide hole 76c may be adjusted by adjusting the position of the plug 76b in the direction of insertion into the flow passage main body 76a.

The second flow regulating passage (rim seal air flow regulating passage) 78 is a pipeline formed between the first cavity 62 and the rim seal space 75. One end of the second flow regulating passage 78 on the side of the first cavity 62 is an opening 120 and the other end on the side of the rim seal space 75 is a discharge opening 122. The second flow regulating passage 78 is disposed in a direction parallel to the radial direction.

The second flow regulating passage 78 has a flow passage main body (plug hole) 78a, and a plug 78b detachably provided in the flow passage main body 78a. The flow passage main body 78a is a hole penetrating the stationary body 52, and provides communication between the first cavity 62 and the rim seal space 75. The flow passage main body 78a has a structure for supporting the plug 78b, for example, a threaded hole or concave and convex shapes. The plug 78b is a bolt, pin, or the like that is detachably attached to the flow passage main body 78a. The plug 78b has a guide hole 78c that penetrates the plug 78b in a direction along the flow passage main body 78a.

With the plug 78b inserted into the flow passage main body 78a, the second flow regulating passage 78 allows cooling air to be supplied from the first cavity 62 to the rim seal space 75 by passing through the guide hole 78c. It is possible to adjust the flow passage resistance of the second flow regulating passage 78 and the ease with which the cooling air passes therethrough by adjusting the area or the position of the guide hole 78c of the plug 78b inserted into the flow passage main body 78a. As with the area of the guide hole 76c, the area of the guide hole 78c, which is the opening area of the hole, can be adjusted by changing the diameter or the side length of the opening. The area of the guide hole 78c can be adjusted in the same manner as the adjustment of the area of the guide hole 76c.

The cooling flow passage structure 50 further has a maintenance hole 98 formed in a part of the stationary body 52 located on the radially outer side of the second flow regulating passage 78, at a position coinciding with the second flow regulating passage 78 in the rotation direction (circumferential direction). The maintenance hole 98 is closed with a detachable sealing mechanism. Provided with the maintenance hole 98, the cooling flow passage structure 50 allows replacement and adjustment of the plug 78b that is the flow regulating means of the second flow regulating passage 78. Thus, the maintenance can be made easy. In the case where the second flow regulating passage 78 extends in a direction inclined relative to the radial direction, the cooling flow passage structure 50 can be provided with the maintenance hole 98 at a position facing, in the extension direction of the second flow regulating passage 78, the discharge opening 122 of the second flow regulating passage 78 leading to the rim seal space 75, so that the second flow regulating passage 78 is accessible from the maintenance hole 98.

In the cooling flow passage structure 50, if the first flow regulating passage 76 is formed at a position coinciding with the second flow regulating passage 78 in the rotation direction (circumferential direction) as in this embodiment, the plug 76b that is the flow regulating means of the first flow regulating passage 76 can be replaced or adjusted by removing the plug 78b of the second flow regulating passage 78. In this case, it is preferable that the flow passage of the first flow regulating passage 76 is formed in a direction parallel to the radial direction. It is also preferable that the first flow regulating passage 76 has the plug 76b inserted with its head (the end on the radially outer side of the rotating body) oriented toward the maintenance hole 98. Thus, the maintenance can be made easier to perform. In the case where the first flow regulating passage 76 and the second flow regulating passage 78 extend in a direction inclined relative to the radial direction, the cooling flow passage structure 50 can be provided with the first flow regulating passage 76, the second flow regulating passage 78, and the maintenance hole 98 at positions facing each other in the extension directions of the flow regulating passages, so that the first flow regulating passage 76 and the second flow regulating passage 78 are accessible from the maintenance holes 98.

In the cooling flow passage structure 50 thus configured, cooling air is supplied from the cooling passage 60 to the first cavity 62. A part of the cooling air having been supplied to the first cavity 62 is supplied through the first cooling passage 66 to the second cavity 64; another part is supplied through the first flow regulating passage 76 to the second cavity 64; yet another part is supplied through the second flow regulating passage 78 to the rim seal space 75; and still another part is supplied through the third cooling passage 69 to the cooling space 70. The cooling air having been supplied to the cooling space 70 is supplied to the bypass space 72. A part of the cooling air having been supplied to the bypass space 72 is supplied through the jumper tube 74 to the rim seal space 75, and another part is supplied to the second cavity 64. The cooling air having been supplied to the second cavity 64 is supplied to the second cooling passage 67. The cooling flow passage structure 50 allows the cooling air supplied thereto to flow through the parts and thereby cool those parts.

Since the cooling flow passage structure 50 is provided with the first flow regulating passage 76 along with the first cooling passage 66, it is possible to regulate the flow rate of the cooling air supplied from the first cavity 62 to the second cavity 64 by adjusting the plug 76b that is the flow regulating means of the first flow regulating passage 76. In this way, the cooling air supplied from the first cavity 62 to the second cavity 64 can be regulated without adjusting the shape or the arrangement of the swirl flow guide nozzles 79. Thus, the regulation is made easy, and the flow rate of cooling air supplied to the parts can be regulated easily even when the properties of gas turbine cooling air have changed due to changes in specifications or aging.

Since the cooling flow passage structure 50 is provided with the second flow regulating passage 78, it is possible to regulate the cooling air supplied from the first cavity 62 to the rim seal space 75 by adjusting the plug 78b that is the flow regulating means of the second flow regulating passage 78. In this way, the cooling air supplied from the first cavity 62 to the rim seal space 75 can be regulated through replacement etc. of the plug. Thus, the regulation is made easy, and the flow rate of cooling air supplied to the parts can be regulated easily even when the properties of gas turbine cooling air have changed due to changes in specifications or aging. Moreover, since the amount of cooling air supplied from the first cavity 62 can be regulated in the cooling flow passage structure 50, the amount of air supplied can be regulated more easily and within a wider range than when the amount is regulated by the jumper tube 74.

Here, it is preferable that, in the cooling flow passage structure 50, the opening 100 of the first flow regulating passage 76 on the side of the first cavity 62 is disposed at a position facing, in the rotation direction 48 (circumferential direction 49) of the rotating body 51, the end surface 79a of the swirl flow guide nozzle 79 on the upstream side in the flow direction 44 as shown in FIG. 3. That is, it is preferable that, in the cooling flow passage structure 50, the opening 100 is disposed at a position overlapping the end surface 79a (leading edge in the axial direction 46) of the swirl flow guide nozzle 79 in the circumferential direction 49. If the opening 100 is disposed at a position facing the end surface 79a of the swirl flow guide nozzle 79 on the upstream side in the flow direction 44, the cooling air can flow in from a part where the flow velocity of the cooling air is low, and thus the cooling air can flow in efficiently, i.e., with little pressure loss. It is similarly preferable that, in the cooling flow passage structure 50, the opening 120 of the second flow regulating passage 78 on the side of the first cavity 62 is disposed at a position facing, in the circumferential direction 49 of the rotating body 51, the end surface 79a of the swirl flow guide nozzle 79 on the upstream side in the flow direction 44 as shown in FIG. 3. That is, it is preferable that, in the cooling flow passage structure 50, the opening 120 is disposed at a position overlapping the end surface 79a (leading edge in the axial direction 46) of the swirl flow guide nozzle 79 in the circumferential direction 49. If the opening 120 is disposed at a position facing the end surface 79a of the swirl flow guide nozzle 79 on the upstream side in the flow direction 44, the cooling air can flow in from a part where the flow velocity of the cooling air is low, and thus the cooling air can flow in efficiently, i.e., with little pressure loss.

It is preferable that, in the cooling flow passage structure 50, the position of the swirl flow guide nozzle 79 and the position of the second cooling passage 67 are close to each other in the radial direction of the rotating body 51. Thus, the cooling air can be efficiently supplied to the second cooling passage 67.

In the cooling flow passage structure of the above embodiment, the discharge opening 102 of the first flow regulating passage 76 leading to the second cavity 64 is formed in the surface of the second cavity 64 that extends in the axial direction and the circumferential direction of the rotational axis, and the end part of the first flow regulating passage 76 on the side of the discharge opening 102 has a shape that extends in a direction inclined toward the rotation direction of the rotating body 51 relative to the radial direction of the rotating body 51. However, the present invention is not limited to this example. For example, the end part on the side of the discharge opening 102 may be parallel to the radial direction of the rotating body 51. Moreover, in the cooling flow passage structure of the above embodiment, the discharge opening 102 of the first flow regulating passage 76 leading to the second cavity 64 may be formed in the surface of the second cavity 64 that extends in the radial direction and the circumferential direction of the rotational axis. That is, the pipeline of the first flow regulating passage 76 may extend along the axial direction. In this case, the end part of the first flow regulating passage 76 on the discharge opening side may have a shape extending parallel to the axial direction of the rotating body 51 or may have a shape extending in a direction inclined toward the rotation direction of the rotating body 51 relative to the axial direction of the rotating body. These points apply to the second flow regulating passage 78 as well.

It is preferable that, as in this embodiment, when seen from the axial direction of the rotating body, the guide hole 76c of the first flow regulating passage 76 is inclined relative to a line that passes through the center of the rotating body 51 and extends in the radial direction of the rotating body 51. Thus, the air flow can be swirled in the rotation direction, and the loss of air flowing into the second cavity 64 can be reduced. While the guide hole 76c is provided in the structure of this embodiment, the present invention is not limited to this example. If the first flow regulating passage 76 of the cooling flow passage structure has a shape that is inclined, when seen from the axial direction of the rotating body, relative to a line that passes through the center of the rotating body 51 and extends in the radial direction of the rotating body 51, the air flow can be swirled in the rotation direction and the loss of air flowing into the second cavity 64 can be reduced.

It is preferable that, as in this embodiment, there are the pluralities of first flow regulating passages 76 and second flow regulating passages 78 disposed in the rotation direction (circumferential direction) of the rotating body 51, and that these flow regulating passages are disposed evenly in the rotation direction (circumferential direction). Thus, variation in supply state of cooling air among the positions in the rotation direction (circumferential direction) can be prevented, and uniform cooling can be realized. While it is preferable that the first flow regulating passages 76 and the second flow regulating passages 78 are disposed uniformly in the rotation direction (circumferential direction) as described above, these flow regulating passages may be disposed non-uniformly. Moreover, the first flow regulating passages 76 and the second flow regulating passages 78 may vary in direction or shape according to the positions at which these flow regulating passages are disposed.

Here, the positions of formation of the first flow regulating passages 76 and the second flow regulating passages 78 are not particularly limited as long as these flow regulating passages provide communication between the spaces. The first flow regulating passages 76 have to be formed as flow passages different from the first cooling passage 66. Specifically, a circle connecting the discharge openings 102 of the first flow regulating passages 76 and centered at the rotational axis has to be offset in at least one of the radial direction and the axial direction of the rotating body 51 from a circle connecting the discharge opening 92 of the first cooling passage 66 and centered at the rotational axis.

For example, the first flow regulating passage 76 may extend along a direction at a right angle to the axial direction of the rotating body 51, and may be formed further on the radially center side of the rotating body 51 than the swirl flow guide nozzle 79.

Figure 7:
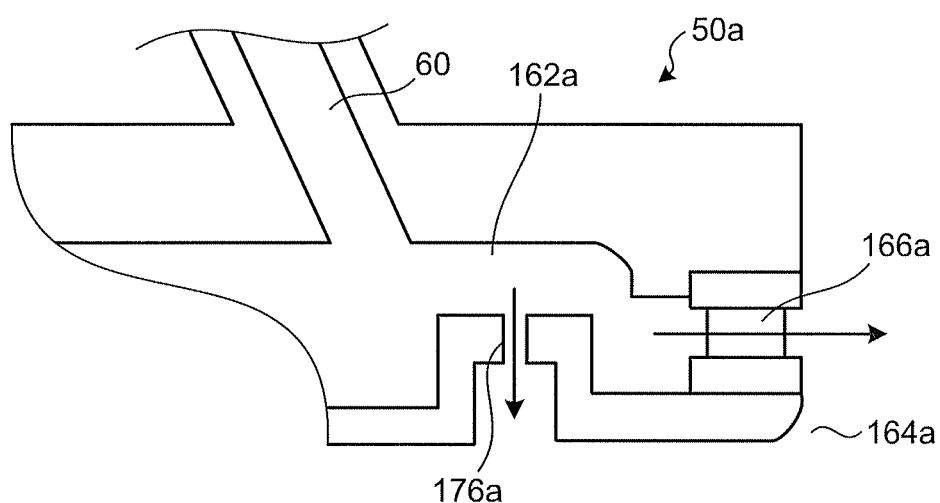
FIG. 7 is a schematic view representing a cooling flow passage structure of the gas turbine.
Figure 8:
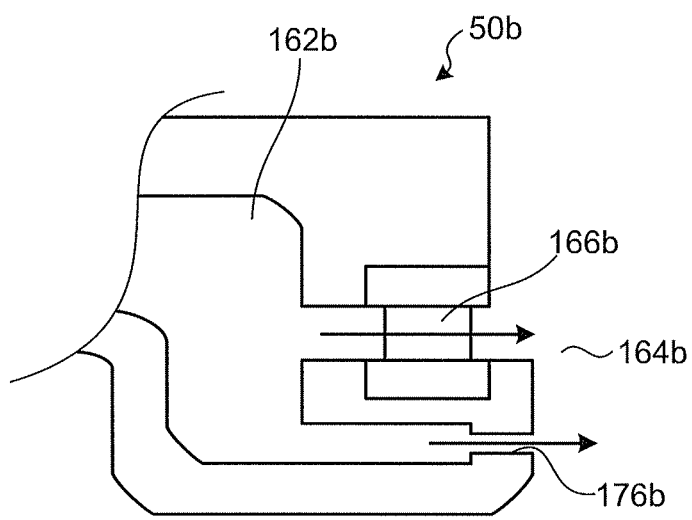
FIG. 8 is a schematic view representing a cooling flow passage structure of the gas turbine.
Figure 9:
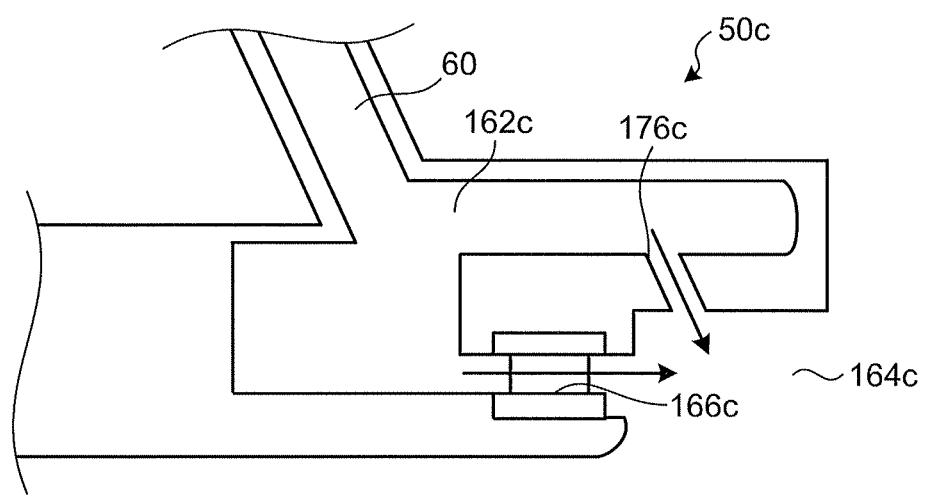
FIG. 9 is a schematic view representing a cooling flow passage structure of the gas turbine.

In the following, modified examples of the relative positions of the first cooling passage and the first flow regulating passage will be described using FIG. 7 to FIG. 9. FIG. 7 to FIG. 9 are schematic views representing cooling flow passage structures of the gas turbine. A cooling flow passage structure 50a shown in FIG. 7 is provided with a first cooling passage 166a and a first flow regulating passage 176a as flow passages that provide communication between a first cavity 162a and a second cavity 164a. The discharge opening of the first flow regulating passage 176a leading to the second cavity 164a is formed in the surface of the stationary body 52 that extends in the axial direction and the circumferential direction of the rotational axis. While the positions of the first cooling passage 166a and the first flow regulating passage 176a in the radial direction of the rotating body 51 overlap each other, the positions of these passages in the axial direction are offset from each other. In such a cooling flow passage structure 50a, too, providing the first flow regulating passage 176a can achieve the above-described effects.

A cooling flow passage structure 50b shown in FIG. 8 is provided with a first cooling passage 166b and a first flow regulating passage 176b as flow passages that provide communication between a first cavity 162b and a second cavity 164b. The discharge opening of the first flow regulating passage 176b leading to the second cavity 164b is formed in the surface of the stationary body 52 that extends in the radial direction and the circumferential direction of the rotational axis. While the positions of the first cooling passage 166b and the first flow regulating passage 176b in the radial direction of the rotating body 51 are offset from each other, the positions of these passages in the axial direction partially overlap each other. In such a cooling flow passage structure 50b, too, providing the first flow regulating passage 176b can achieve the above-described effects.

A cooling flow passage structure 50c shown in FIG. 9 is provided with a first cooling passage 166c and a first flow regulating passage 176c as flow passages that provide communication between a first cavity 162c and a second cavity 164c. The first cooling passage 166c is formed further on the side of the supply passage 60 (radially inner side of the rotating body 51) in the axial direction of the rotating body 51 than the first flow regulating passage 176c. The pipeline of the first flow regulating passage 176c extends in a direction inclined relative to the axial direction and the radial direction. In such a cooling flow passage structure 50c, too, providing the first flow regulating passage 176c can achieve the above-described effects.

In the above embodiment, the flow regulating means of both the first flow regulating passage 76 and the second flow regulating passage 78 are plugs with the guide hole. However, the present invention is not limited to this example. Any mechanism can be adopted that can adjust the flow passage resistance of the first flow regulating passage 76 and the second flow regulating passage 78 and the ease with which cooling air flows therethrough while being detachably attached to the flow passage main bodies of the first flow regulating passage 76 and the second flow regulating passage 78. For example, a screw provided with an opening that varies in size according to the amount of insertion into the flow passage main body may be used as the flow regulating means.

REFERENCE SIGNS LIST

10 Gas turbine
11 Compressor
12 Combustor
13 Turbine
50 Cooling flow passage structure
51 Rotating body
52 Stationary body
60 Supply passage
62 First cavity
64 Second cavity
66 First cooling passage
67 Second cooling passage
69 Third cooling passage
70 Cooling space
72 Bypass space
74 Jumper tube
75 Rim seal space
76 First flow regulating passage
76a, 78a Flow passage main body (plug hole)
76b, 78b Plug (flow regulating means)
76c, 78c Guide hole
78 Second flow regulating passage (rim seal air flow regulating passage)
79 Swirl flow guide nozzle
79a End surface
80, 81, 82, 83 Sealing mechanism (labyrinth seal)
90, 100, 120 Opening
92, 102, 122 Discharge opening

The invention claimed is:

1. A gas turbine in which a stationary body and a rotating body are positioned and the rotating body is configured to be supplied with cooling air, the gas turbine comprising:
  a first cavity defined inside the stationary body and configured to be supplied with the cooling air;
  a second cavity defined between the stationary body and the rotating body;
  a first cooling passage defined between the first cavity and the second cavity and having a swirl flow guide nozzle therein configured to supply the cooling air from the first cavity to the second cavity while swirling the cooling air from the first cavity along a rotation direction of the rotating body;
  a second cooling passage defined in the rotating body, in communication with the second cavity, and configured to be supplied with the cooling air from the second cavity;
  a flow regulating passage which is a cooling air flow passage, different from the first cooling passage, defined between the first cavity and the second cavity and through which the cooling air from the first cavity is configured to be supplied to the second cavity;

a bypass space defined between the rotating body and the stationary body, the bypass space being further radially inward than the first cavity and further upstream than the second cavity;

a rim seal space defined between the stationary body and a surface of the rotating body that extends in a radial direction and a circumferential direction; and a jumper tube that is a pipeline defined in the stationary body, the jumper tube passing through an interior of the first cavity and communicating the bypass space with the rim seal space, wherein:

a position of an opening of the flow regulating passage on a side of the first cavity in an axial direction is between the jumper tube and the swirl flow guide nozzle in the interior of the first cavity;

the flow regulating passage has flow regulating means;

the flow regulating means has a guide hole; and an area or a position of the guide hole is adjustable such that the flow regulating means is configured to regulate a flow rate of the cooling air from the first cavity.

2. The gas turbine according to claim 1, wherein:

the swirl flow guide nozzle is one of a plurality of swirl flow guide nozzles around an axis of the rotating body; and the flow regulating passage is one of a plurality of flow regulating passages around the axis of the rotating body.

3. The gas turbine according to claim 1, wherein the flow regulating means is a plug that is detachably attached to the flow regulating passage.

4. The gas turbine according to claim 3, wherein, from an axial direction of the rotating body, the guide hole is inclined relative to a line that passes through a center of the rotating body and extends in a radial direction of the rotating body.

5. The gas turbine according to claim 1, wherein, from an axial direction of the rotating body, the flow regulating passage is inclined relative to a line that passes through a center of the rotating body and extends in a radial direction of the rotating body.

6. The gas turbine according to claim 1, wherein:

a discharge opening of the flow regulating passage which leads to the second cavity is defined in a surface of the stationary body that extends in a radial direction and a circumferential direction of a rotational axis; and an end part of the flow regulating passage on a discharge opening side extends in a direction parallel to an axial direction of the rotating body, or in a direction inclined toward the rotation direction of the rotating body relative to the axial direction of the rotating body.

7. The gas turbine according to claim 1, wherein:

a discharge opening of the flow regulating passage which leads to the second cavity is defined in a surface of the stationary body that extends in an axial direction and a circumferential direction of a rotational axis; and an end part of the flow regulating passage on a discharge opening side extends in a direction parallel to a radial direction of the rotating body, or in a direction inclined toward the rotation direction of the rotating body relative to the radial direction of the rotating body.

8. The gas turbine according to claim 1, further comprising:

a rim seal air flow regulating passage that is a cooling air flow passage, different from the first cooling passage and the flow regulating passage, defined between the first cavity and the rim seal space, wherein the rim seal air flow regulating passage has rim seal air flow regulating means for regulating the flow rate of the cooling air from the first cavity to the rim seal space.

9. The gas turbine according to claim 8, wherein:

the rim seal air flow regulating means is a plug that is detachably attached to the rim seal air flow regulating passage, and the plug has a guide hole for the cooling air to flow through.

10. The gas turbine according to claim 8, wherein an opening of the rim seal air flow regulating passage on the first cavity side is at a position overlapping a leading edge of the swirl flow guide nozzle in the circumferential direction of the rotating body.

11. The gas turbine according to claim 1, wherein the second cavity is partly defined by a stationary member of the stationary body in which the first cooling passage is defined and by a disc of a rotor that is the rotating body on which a first-stage blade is mounted.

12. The gas turbine according to claim 1, wherein the second cooling passage is further on a downstream side in an axial direction of the rotating body than the swirl flow guide nozzle, and extends along the axial direction inside a disc of the rotor that is the rotating body.

13. The gas turbine according to claim 1, further comprising a third cooling passage defined through a surface on a radially inner side of the first cavity and in communication with a cooling space defined between the rotating body and the stationary body, the third cooling passage being a flow passage of the cooling air that is different from the first cooling passage and the flow regulating passage.

14. A gas turbine in which a stationary body and a rotating body are positioned and the rotating body is configured to be supplied with cooling air, the gas turbine comprising:

a first cavity defined inside the stationary body and configured to be supplied with the cooling air;

a second cavity defined between the stationary body and the rotating body;

a first cooling passage defined between the first cavity and the second cavity and having a swirl flow guide nozzle therein configured to supply the cooling air from the first cavity to the second cavity while swirling the cooling air from the first cavity along a rotation direction of the rotating body;

a second cooling passage defined in the rotating body, in communication with the second cavity, and configured to be supplied with the cooling air from the second cavity; and a flow regulating passage which is a cooling air flow passage, different from the first cooling passage, defined between the first cavity and the second cavity and through which the cooling air from the first cavity is configured to be supplied to the second cavity, wherein:

the flow regulating passage has flow regulating means for regulating a flow rate of the cooling air; and an opening of the flow regulating passage on the first cavity side is at a position overlapping a leading edge of the swirl flow guide nozzle in a circumferential direction of the rotating body.

15. A gas turbine in which a stationary body and a rotating body are positioned and the rotating body is configured to be supplied with cooling air, the gas turbine comprising:

a first cavity defined inside the stationary body and configured to be supplied with the cooling air;

a second cavity defined between the stationary body and the rotating body;

a first cooling passage defined between the first cavity and the second cavity and having a swirl flow guide nozzle therein configured to supply the cooling air from the first cavity to the second cavity while swirling the cooling air from the first cavity along a rotation direction of the rotating body;

a second cooling passage defined in the rotating body, in communication with the second cavity, and configured to be supplied with the cooling air from the second cavity; and a flow regulating passage which is a cooling air flow passage, different from the first cooling passage, defined between the first cavity and the second cavity and through which the cooling air from the first cavity is configured to be supplied to the second cavity, wherein:

the flow regulating passage has flow regulating means for regulating a flow rate of the cooling air; and a rim seal air flow regulating passage is defined at a position overlapping the flow regulating passage in the circumferential direction of the rotating body.

16. The gas turbine according to claim 15, wherein the stationary body has a maintenance opening defined at a position distanced from a rotational axis of the rotating body further than the rim seal air flow regulating passage and facing a discharge opening of the rim seal air flow regulating passage which leads to the rim seal space.

\* \* \* \* \*